(12) United States Patent  
Gershon et al.

(10) Patent No.: US 10,888,479 B1  
(45) Date of Patent: Jan. 12, 2021

(54) BIOSAFETY ENCLOSURE FOR OCCUPANTS OF VEHICLES

(71) Applicants: Alan Gershon, Sunrise, FL (US); John O'Connor, Lisbon (PT)

(72) Inventors: Alan Gershon, Sunrise, FL (US); John O'Connor, Lisbon (PT)

(*) Notice: Subject to any disclaimer, the term of this patent is extended or adjusted under 35 U.S.C. 154(b) by 0 days.

(21) Appl. No.: 16/930,432

(22) Filed: Jul. 16, 2020

Related U.S. Application Data

(60) Provisional application No. 63/035,402, filed on Jun. 5, 2020.

(51) Int. Cl.
| | |
|---|---|
| A61G 10/00 | (2006.01) |
| A61G 3/00 | (2006.01) |
| B64D 11/06 | (2006.01) |
| B63B 29/02 | (2006.01) |

(52) U.S. Cl.  
CPC ........... *A61G 10/005* (2013.01); *A61G 3/008* (2013.01); *B64D 11/0606* (2014.12); *B63B 2029/027* (2013.01)

(58) Field of Classification Search  
CPC ...... A61G 10/005; A61G 10/02; A61G 10/04; A61G 3/001; A61G 1/013; A61G 2203/80; A61G 11/00  
See application file for complete search history.

(56) References Cited

U.S. PATENT DOCUMENTS

| | | | | |
|---|---|---|---|---|
| 6,461,290 B1* | 10/2002 | Reichman | ............ | A61G 10/005 5/312 |
| 8,007,351 B1* | 8/2011 | Maloney | ............... | A61G 10/005 454/187 |
| 2003/0197003 A1* | 10/2003 | Kneuer | ................... | A61G 11/00 219/494 |
| 2009/0093671 A1* | 4/2009 | Maloney | .............. | A61G 10/005 600/21 |

* cited by examiner

*Primary Examiner* — Christine H Matthews  
(74) *Attorney, Agent, or Firm* — Arent Fox LLP

(57) ABSTRACT

Disclosed herein is a biosafety enclosure for protecting occupants of a vehicle from pathogens. In one example, the biosafety enclosure comprises a protective cover member made of a durable material shaped to form a three-dimensional structure that is installed inside of the vehicle and isolates the one or more occupants of the biosafety enclosure from other occupants of the vehicle. The biosafety enclosure comprises a plurality of connectors attached to the protective cover member in order to secure the protective cover member inside the vehicle. In addition, the biosafety enclosure comprises one or more air circulation vents disposed within the protective cover member, wherein an air circulation vent is connectable to an external air filtration device or an air filtration system of the vehicle. The biosafety enclosure also comprises an ingress/egress member comprised in the protective cover member to allow entry/exit of occupants to/from the enclosure.

18 Claims, 11 Drawing Sheets

BIOSAFETY ENCLOSURE FOR OCCUPANTS OF VEHICLES

CROSS-REFERENCE TO RELATED APPLICATIONS

This application claims the benefit of U.S. Provisional Application No. 63/035,402, filed Jun. 5, 2020, which is herein incorporated by reference.

FIELD OF TECHNOLOGY

The present disclosure relates to the field of biosafety, and, more specifically, to an enclosure for protective of occupants in a vehicle from pathogens.

BACKGROUND

Vehicles such as cars, buses, trains, ships, and airplanes often transport a multitude of passengers from one place to another. Because of the small area to move around in these vehicles and the close proximity of passengers, these vehicles can facilitate the spread of pathogens. For example, passengers may touch common handrails or cough/sneeze without cover. Certain pathogens are highly contagious. As a result, airborne particles from a cough/sneeze may be inhaled by other passengers and surfaces that have residue consisting of the pathogen may be touched by multiple passengers.

Some common approaches to prevent the spread of pathogens include limiting the movement of passengers within the vehicle to reduce contact possibilities and enforcing personal protective equipment (PPE). However, the movement of passengers is typically most prevalent when the passengers are entering the exiting the vehicle. This movement cannot be limited without the significant redesign of modern day vehicles. Likewise, certain movement is inevitable during trips. For example, passengers typically require the use of restrooms and this entails exiting a seat, traveling to the restroom, and then returning back to the seat. This simple trip presents many opportunities for contact. In terms of PPE, even if a passenger wears PPE, the quality of the PPE and whether the passenger wears the PPE appropriately are variables that are difficult to measure.

There is thus a need for an approach that prevents direct contact between passengers as they move within the vehicle and that reduces the variables in the quality of protection.

SUMMARY

To address this need, aspects of the present disclosure are directed to a biosafety enclosure that may be installed in vehicles (whether at the time of construction of the vehicle or afterwards) to protect occupants from pathogens.

In an exemplary aspect, the biosafety enclosure for one or more occupants of a vehicle comprises a protective cover member made of a durable material shaped to form a three-dimensional structure that is installed inside of the vehicle and isolates the one or more occupants of the biosafety enclosure from other occupants of the vehicle. The biosafety enclosure comprises a plurality of connectors attached to the protective cover member and configured to affix to a ceiling, a floor, a wall, and/or a structure within the vehicle in order to secure the protective cover member inside the vehicle. In addition, the biosafety enclosure comprises one or more air circulation vents disposed within the protective cover member, wherein an air circulation vent is connectable to an external air filtration device or an air filtration system of the vehicle. The biosafety enclosure also comprises an ingress/egress member comprised in the protective cover member to allow entry/exit of occupants to/from the enclosure.

In some aspects, the protective cover member is comprised of a plurality of partitions comprising at least a front partition, a rear partition, a right-side partition, and a left-side partition, and the ingress/egress member is disposed in one of the plurality of partitions.

In some aspects, at least one partition of the plurality of partitions is transparent.

In some aspects, the plurality of partitions is made up of at least one of: fabric, plastic, metal, wood, steel.

In some aspects, the protective cover member encompasses at least one seat of the vehicle.

In some aspects, at least one of the plurality of connectors is attached to the at least one seat and secures at least one partition of the plurality of partitions to the at least one seat.

In some aspects, the size of the biosafety enclosure can be modified by reclining at least one seat of the vehicle.

In some aspects, the size of the biosafety enclosure can be modified by expanding or retracting a partition of the plurality of partitions.

In some aspects, the biosafety enclosure can be merged with an adjacent biosafety enclosure by modifying or removing at least one partition between the biosafety enclosure and the adjacent biosafety enclosure.

In some aspects, at least one partition of the plurality of partitions is made of a fire-retardant material.

In some aspects, the plurality of connectors comprises at least one of a hook, a sealant, stitching, a staple, a magnet, a spring snap, and a Velcro strip.

In some aspects, the plurality of connectors are comprised in a frame that forms a three-dimensionally shaped structure and the protective cover member is attached to the frame.

In some aspects, the ingress/egress member is a sealable cutout in the protective cover member. In some aspects, the ingress/egress member is a door attached via door hinges to the protective cover member.

In some aspects, the biosafety enclosure further comprises a handle attached to an outer surface of the biosafety enclosure, wherein the handle provides support to occupants of the vehicle while moving within the vehicle. The present disclosure also discusses a method for providing biosafety for occupants of a vehicle, the method comprising: providing a biosafety enclosure comprising: (1) a protective cover member made of a durable material shaped to form a three-dimensional structure that isolates the one or more occupants of the biosafety enclosure from other occupants of the vehicle; (2) a plurality of connectors; and (3) one or more air circulation vents; connecting the plurality of connectors to a ceiling, a floor, a wall, and/or a structure around an area within the vehicle that will house one or more occupants; providing an ingress/egress member in a partition of the protective cover member to allow entry/exit of occupants to/from the biosafety enclosure; and connecting an external air filtration device or an air filtration system of the vehicle to the one or more air circulation vents of the biosafety enclosure.

The present disclosure also presents a system for pathogen protection in a vehicle by using features of the biosafety enclosure. In an exemplary aspect, the system comprises the biosafety enclosure for one or more occupants of a vehicle, and the biosafety enclosure comprises a protective cover member made of a durable material shaped to form a three-dimensional structure that is installed inside of the vehicle and isolates the one or more occupants of the biosafety enclosure from other occupants of the vehicle. The system further comprises at least one sensor that collects biometric data of the one or more occupants inside the biosafety enclosure. The system further comprises a hardware processor configured to receive the biometric data, determine a likelihood of pathogenic exposure inside the biosafety enclosure based on the biometric data, and generate an alert indicative of the pathogenic exposure in response to determining that the likelihood is greater than a configurable threshold likelihood.

In some aspects, the biosafety enclosure further comprises an ingress/egress member comprised in the protective cover member to allow entry/exit of occupants to/from the enclosure. The system further comprises a locking mechanism for the ingress/egress member of the enclosure, and the hardware processor is further configured to lock the locking mechanism in response to determining that the likelihood is greater than the threshold likelihood.

In some aspects, the hardware processor is further configured to receive a plurality of likelihoods associated with neighboring biosafety enclosures, compare the likelihood of the biosafety enclosure with the plurality of likelihoods of the neighboring biosafety enclosures, and unlock the ingress/egress member of the biosafety enclosure based on the comparison.

In some aspects, the biosafety enclosure further comprises one or more air circulation vents disposed within the protective cover member, wherein an air circulation vent is connectable to an external air filtration device or an air filtration system of the vehicle. The hardware processor is further configured to adjust, via the one or more air circulation vents, air pressure inside of the biosafety enclosure to prevent contaminated air from escaping the biosafety enclosure in response to determining that the likelihood is greater than the threshold likelihood.

In some aspects, the biometric data comprises at least one of (1) an indication of coughing, (2) an indication of sneezing, (3) body temperature, (4) heart rate, (5) blood pressure, and (6) breathing rate.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a biosafety enclosure and installation of the biosafety enclosure that limits the spread of pathogens in vehicles. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
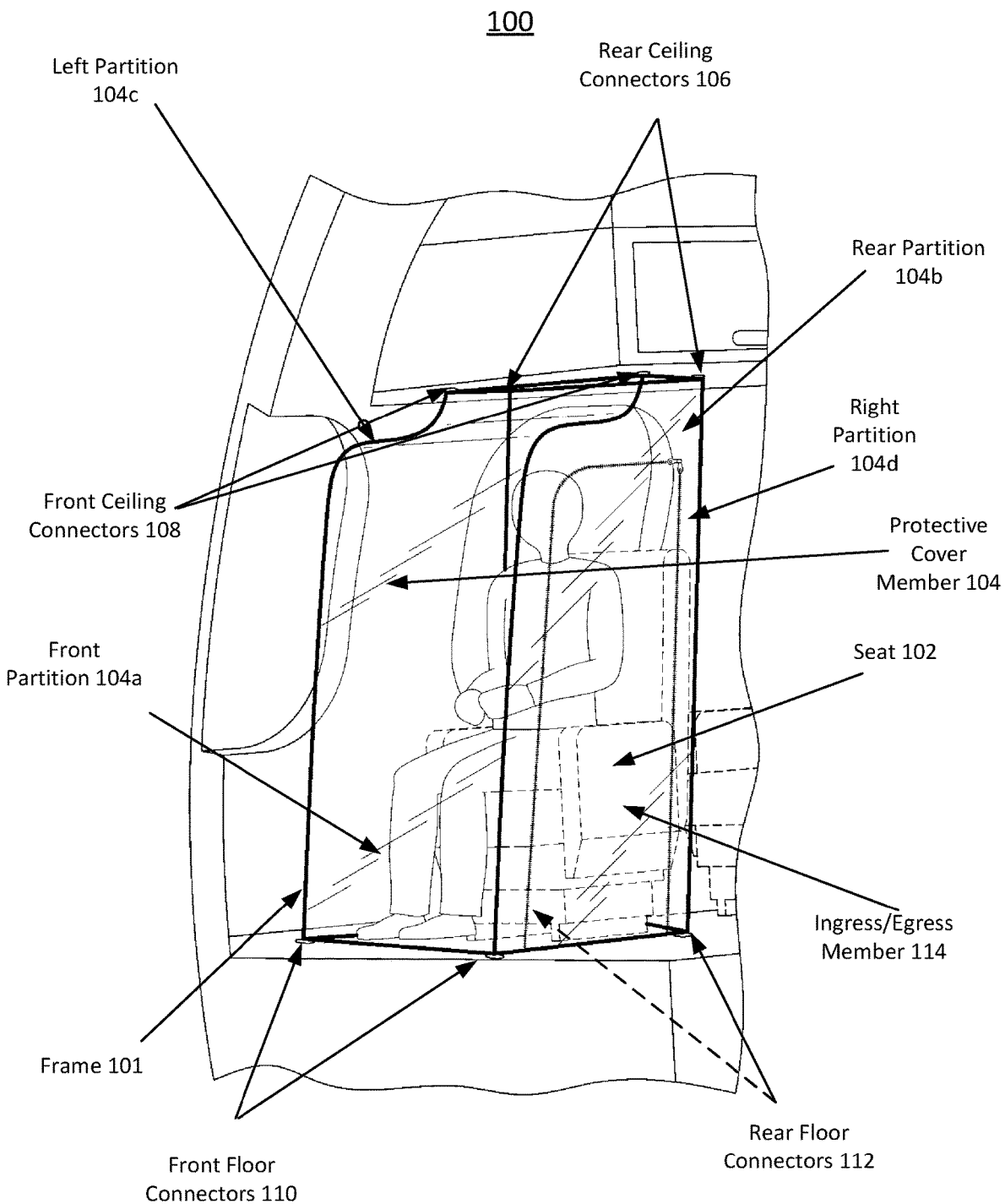
FIG. 1 is a diagram illustrating a biosafety enclosure that extends from the floor to the ceiling of a vehicle, in accordance with aspects of the present disclosure.

FIG. 1 is a diagram illustrating biosafety enclosure 100 that extends from the floor to the ceiling of a vehicle, in accordance with aspects of the present disclosure. Biosafety enclosure 100 is designed to reduce the spread of the pathogen. In an exemplary aspect, a biosafety enclosure represents a barrier, within a given vehicle, that isolates one or more occupants from other parts of the vehicle and occupants. A single vehicle may comprise a plurality of biosafety enclosures. As a result, airflow is prevented between adjacent biosafety enclosures. In FIG. 1, biosafety enclosure 100 is a barrier for an occupant (e.g., a passenger sitting in seat 102) against all other parts of the vehicle. The vehicle may be any type of vehicle. For example, the vehicle may be a commercial vehicle (e.g., a plane, a truck, a train, a ship, etc.), a consumer vehicle (e.g., a car, a bike, a van, etc.), or a military vehicle (e.g., a jet, a tank, a rocket, a submarine, etc.).

There are two direct outcomes of the biosafety enclosure. Firstly, if an occupant coughs or sneezes within biosafety enclosure 100, the air/liquid particles are kept within biosafety enclosure 100 and can be safely removed via air circulation systems and/or filtration systems. Because of this, other parts of the vehicle are not exposed to potential pathogens. Second, if another occupant coughs or sneezes outside of biosafety enclosure 100 (whether the occupant is in any other biosafety enclosure or aisle of the vehicle), the air/liquid particles are kept out of biosafety enclosure 100. Because of this, a healthy occupant within biosafety enclosure 100 is not exposed to potential pathogens outside of biosafety enclosure 100.

When a occupant leaves their seat, the majority of other occupants will be safely protected. When occupants remove their personal protective equipment to eat or drink, the number of other occupants that might be exposed is drastically limited by the presence of the biosafety enclosures. Additionally, the biosafety enclosures can give ease of mind to occupants, helping to alleviate the fear of contracting an infectious disease while travelling.

Biosafety enclosure 100 comprises protective cover 104 member made of a durable material shaped to form a three-dimensional structure that fits inside of the vehicle and isolates the one or more occupants of the biosafety enclosure from other occupants of the vehicle. The protective cover member may be secured inside the vehicle by a plurality of connectors (e.g., rear ceiling connectors 106, front ceiling connectors 108, front floor connectors 110, and rear floor connectors 112) attached to protective cover member 104 and configured to affix protective cover member 104 to a ceiling, a floor, a wall, and/or a structure within the vehicle.

Seat 102 may be a single seat with adjacent seats immediately ahead and directly behind seat 102. As shown in FIG. 1, seat 102 is enclosed within biosafety enclosure 100. The size of biosafety enclosure 100 may be such that at least one human of average size can comfortably enter, sit, and exit from within biosafety enclosure 204. For example, biosafety enclosure 100 may be a rectangular volume with a width of 2.5 feet, a height of 5 feet, and a length of 3.5 feet.

In some aspects, protective cover member 104 is a single uniform structure made from a rigid material (e.g., a glass enclosure) that forms the three-dimensional structure. In other aspects, protective cover member 104 is made from a non-rigid material (e.g., a plastic sheet) that is kept taut by the plurality of connectors. In some aspects, protective cover member 104 is made from a semi-rigid or flexible material (e.g., plexiglass). In some aspects, the protective cover member is made up of a plurality of partitions (e.g., front partition 104a, rear partition 104b, left partition 104c, and right partition 104d), where each partition is made up of either a rigid, non-rigid, or semi-rigid material. In either case, protective cover member 104 is fixed and kept secured in the vehicle by a plurality of connectors.

The plurality of connectors may be fixed to a point in the vehicle (e.g., a wall, a ceiling, a floor, a suspended structure, a fixed structure, etc.) using any combination of merging equipment/material such as sealants, stitching, glue, staples, magnets, etc. The connectors themselves may be fasteners that attach to the uni-body structure of protective cover member 104 or to a plurality of partitions of protective cover member 104. For example, a connector may be a spring snap, a sealant, a stitch, glue, a staple, a magnet, a hook, a Velcro strip, etc. The plurality of connectors may comprise rear ceiling connectors 106 and front ceiling connectors 108, which may be connected to the surface above seat 102 (e.g., the ceiling of the vehicle or the bottom surface of a storage compartment above seat 102). The plurality of partitions may further comprise front floor connectors 110 and rear floor connector 112, which may be connected to the floor of the vehicle.

In FIG. 1, front partition 104a is held in place by front floor connectors 110 and front ceiling connectors 108. Rear partition 104b is held in place by rear floor connectors 112 (where the dashed line points to a non-visible connector behind seat 102) and rear ceiling connectors 106. Left partition 104c is held in place by the left-side connectors of connectors 106, 108, 110, and 112. Right partition 104d is held in place by the right-side connectors of connectors 106, 108, 110, and 112.

Until this point, the plurality of connectors are discussed as points fixed to the vehicle (e.g., on the floor, the ceiling, the seat, a wall, a suspended structure) and connected by partitions that make up biosafety enclosure 100. Weight is generally an issue for the efficiency of many modes of transportation. Accordingly, each partition can be made up of any number of lightweight plastic materials (e.g., PVC), textiles (e.g., silnylon), or a combination of materials. In some aspects, the plurality of partitions comprised in biosafety enclosure 100 may be made up of any combination of fabric, plastic, metal, wood, and steel. In some aspects, the various materials that make up the biosafety enclosure 100 are flame retardant and/or fire resistant. These attributes can be an inherent property of the material or can be established via a coating. Each partition can be attached to a respective connector of the plurality of connectors through any combination of merging equipment/material such as hooks, sealants, stitching, glue, staples, magnets, etc. For example, rear ceiling connectors 106 may be hooks attached to the ceiling of the vehicle with a magnet. Likewise, rear floor connectors 112 may be additional hooks attached to the floor of the vehicle with a magnet. Rear partition 104b may be a transparent plastic that features holes that can fit through the hooks of connectors 106 and 112 and thus create a barrier for airflow to the seat behind seat 102.

Biosafety enclosure 100 also includes ingress/egress member 114 disposed within right partition 104d of protective cover member 100 to allow entry/exit of occupants to/from the enclosure. In some aspects, an entryway may be dedicated to entering the biosafety enclosure and another entryway may be dedicated to exiting the biosafety enclosure. For example right partition 104b may include ingress member 114 and left partition 104c may include an egress member. Ingress/egress member 114 may save space using a plastic zippered closure system (e.g., ITW MaxiGrip), Velcro, magnets, or other closure systems with the ability to quickly open/close biosafety enclosure 100 in case of an emergency. In some aspects, ingress/egress member 114 may include a pull tab to allow an occupant to open/close biosafety enclosure 100.

In some aspects, biosafety enclosure 100 is made up of a rigid or semi-rigid frames. A first frame member connects to all of the first plurality of connectors (e.g., the right-side connectors in connectors 106, 108, 110, and 112. A second frame member connects to the a second plurality of connectors (e.g., the left-side connectors). Two lower frame members may be connect the first frame member to the second frame member via front floor connectors 110 and rear floor connectors 112, respectively. Two upper frame members may be connect the first frame member to the second frame member via front ceiling connectors 108 and rear ceiling connectors 106, respectively. Frame 101 which comprises all frame members described is shown in FIG. 1 as a bold line. In this aspect, the surface area between the frames may be covered by partitions of protective cover 104 (e.g., transparent plastic), such that the seat 102 is fully isolated from the rest of the vehicle.

In some aspects, the partitions, whether connected to the individual connectors or a frame, are removable. This allows for easy cleaning of biosafety enclosure 100. Rather than having to crouch and potentially miss hard to reach areas of biosafety enclosure 100 while cleaning the vehicle, the partitions can be removed, cleaned, and reattached. Depending on the material used for the partitions, a more thorough cleaning can be performed. For example, a conventional method of cleaning the vehicle may involve uses spray guns, wipes, and dusters. By removing the partitions, if the materials of each partition are machine washable, cleaning of biosafety enclosure 100 is made faster and more thorough via a washer and dryer. In some aspects, if the materials of the partitions of biosafety enclosure 100 have degraded or have deteriorated, or have been used for a threshold number of times, new partitions can be installed.

Figure 2:
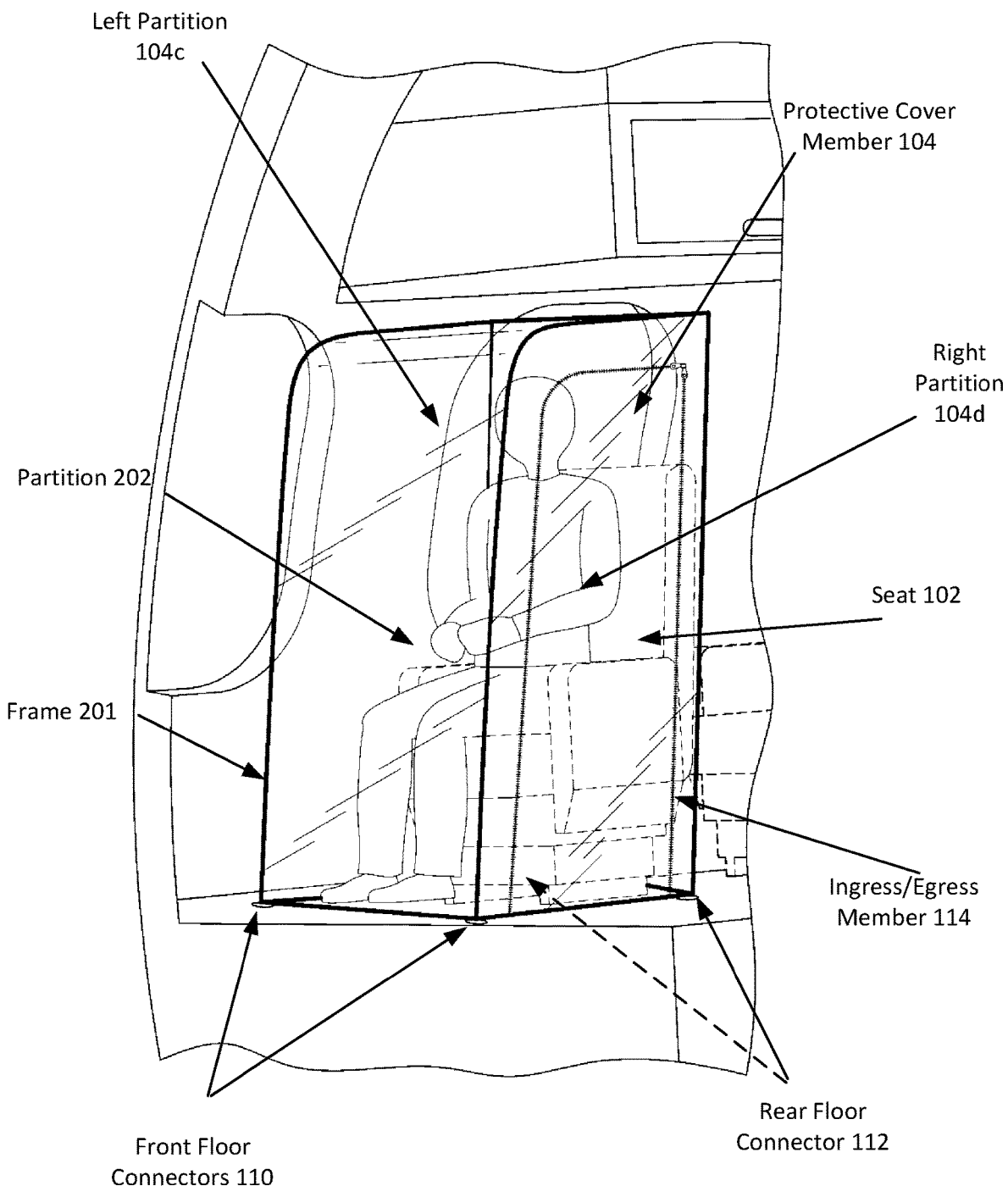
FIG. 2 is a diagram illustrating a version of the biosafety enclosure that does not connect to the ceiling of a vehicle, in accordance with aspects of the present disclosure.

FIG. 2 is a diagram illustrating a version of biosafety enclosure 100 (i.e., biosafety enclosure 200) that does not connect to the ceiling of a vehicle, in accordance with aspects of the present disclosure. Biosafety enclosure 200 shares all of the features of biosafety enclosure 100 described above except for the ceiling connectors 106 and 108. Rather than connecting to the ceiling, protective cover member 104 comprises partition 202 that extends from the front floor connectors 110 to rear floor connectors 112 over the occupant. In some aspects, protective cover member 104 may be connected to frame 201 which is secured to the floor of the vehicle. The frame may be made of a strong rigid material to maintain the three-dimensional shape of biosafety enclosure 200.

In some aspects, biosafety enclosure 200 may have an adjustable height. For example, in the case that partition 202 is made from a rigid material that can support a significant weight (e.g., up to 50 lbs.), the space been the ceiling and the portion of partition 202 extending over right partition 104d and left partition 104c can be used to place additional luggage. For example, seat 102 may seat a small child that does not need a high ceiling to comfortably enter, sit, and exit seat 102. The upright members of frame 201 may be expandable, stretchable, or can be elongated. Accordingly, a flight attendant may reduce the height of the upright members, and may place extra carry-on luggage on top of the partition 202. In some aspects, instead of lowering the partition, a divider may be added inside biosafety enclosure 200 between the partition 202 and the head rest of seat 102. The divider may then be used to place carry luggage or other items.

Figure 3:
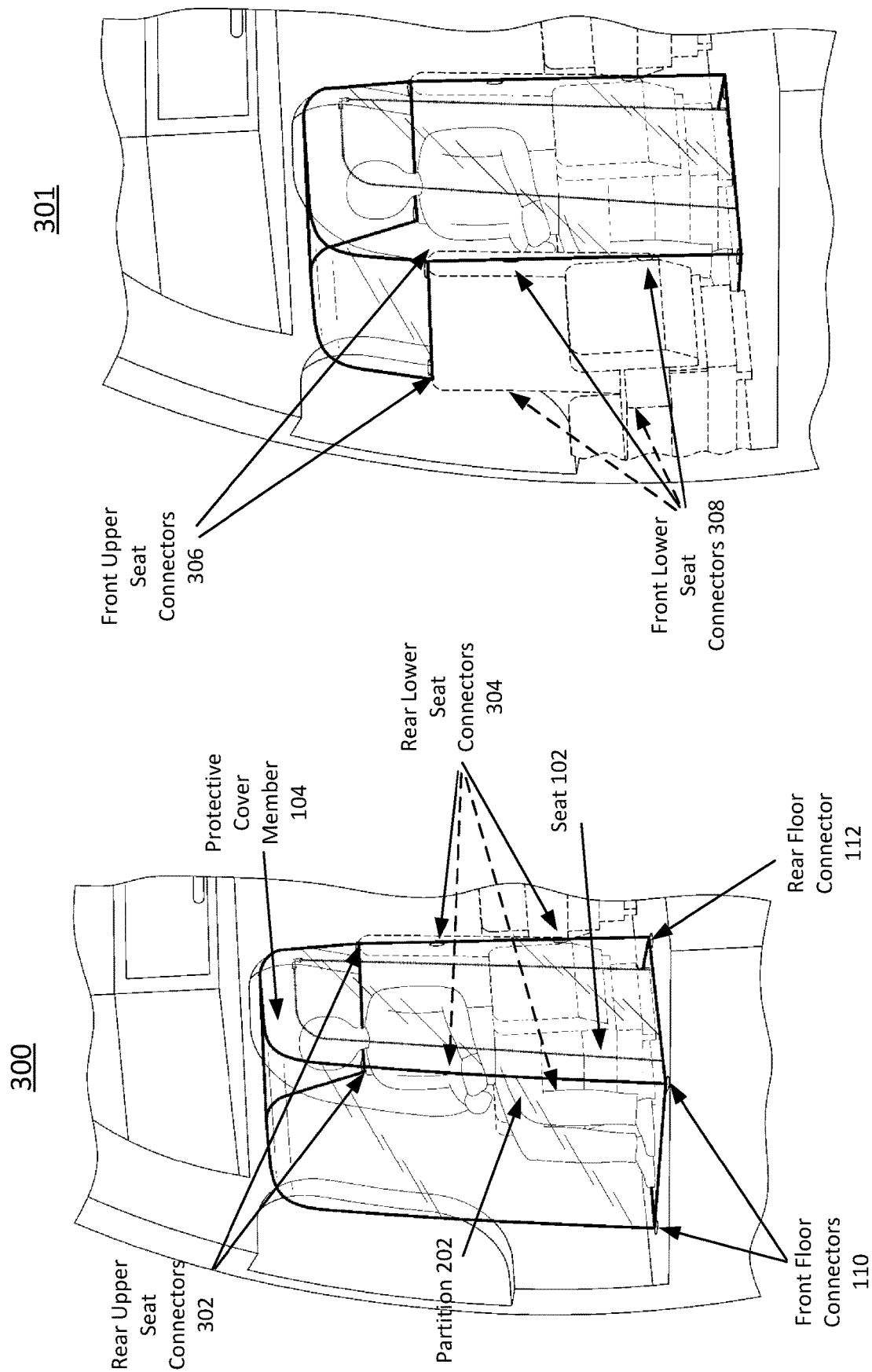
FIG. 3a is a diagram illustrating a version of the biosafety enclosure that is connected to a seat in a vehicle, in accordance with aspects of the present disclosure.
FIG. 3b is a diagram illustrating a version of the biosafety enclosure that is connected to multiple seats in a vehicle, in accordance with aspects of the present disclosure.

FIG. 3a is a diagram illustrating a version of biosafety enclosure 200 (i.e., biosafety enclosure 300) that is connected to a seat in a vehicle, in accordance with aspects of the present disclosure. In FIG. 3a, no other seat is present in front of seat 102. To further secure biosafety enclosure 200, biosafety enclosure 300 comprises rear upper seat connectors 302 and rear lower seat connectors 304 that attach to protective cover member 104. In some aspects, the size of biosafety enclosure 300 can be adjusted by an individual sitting in seat 102. For example, the occupant may recline seat 102. In such a case, the protective cover member 104 may expand to accommodate the position of the reclined seatback. For example, partition 202 may be a folding material that can retract or expand (e.g., like an accordion/shutter panel) to ensure that the connectors remain connected to protective cover member 104. FIG. 3b is a diagram illustrating a version of biosafety enclosure 300 (i.e., biosafety enclosure 301) that is connected to multiple seats in a vehicle, in accordance with aspects of the present disclosure. Biosafety enclosure 301 is additionally attached to front upper seat connectors 306 and front lower seat connectors 308 for securing purposes.

Figure 4:
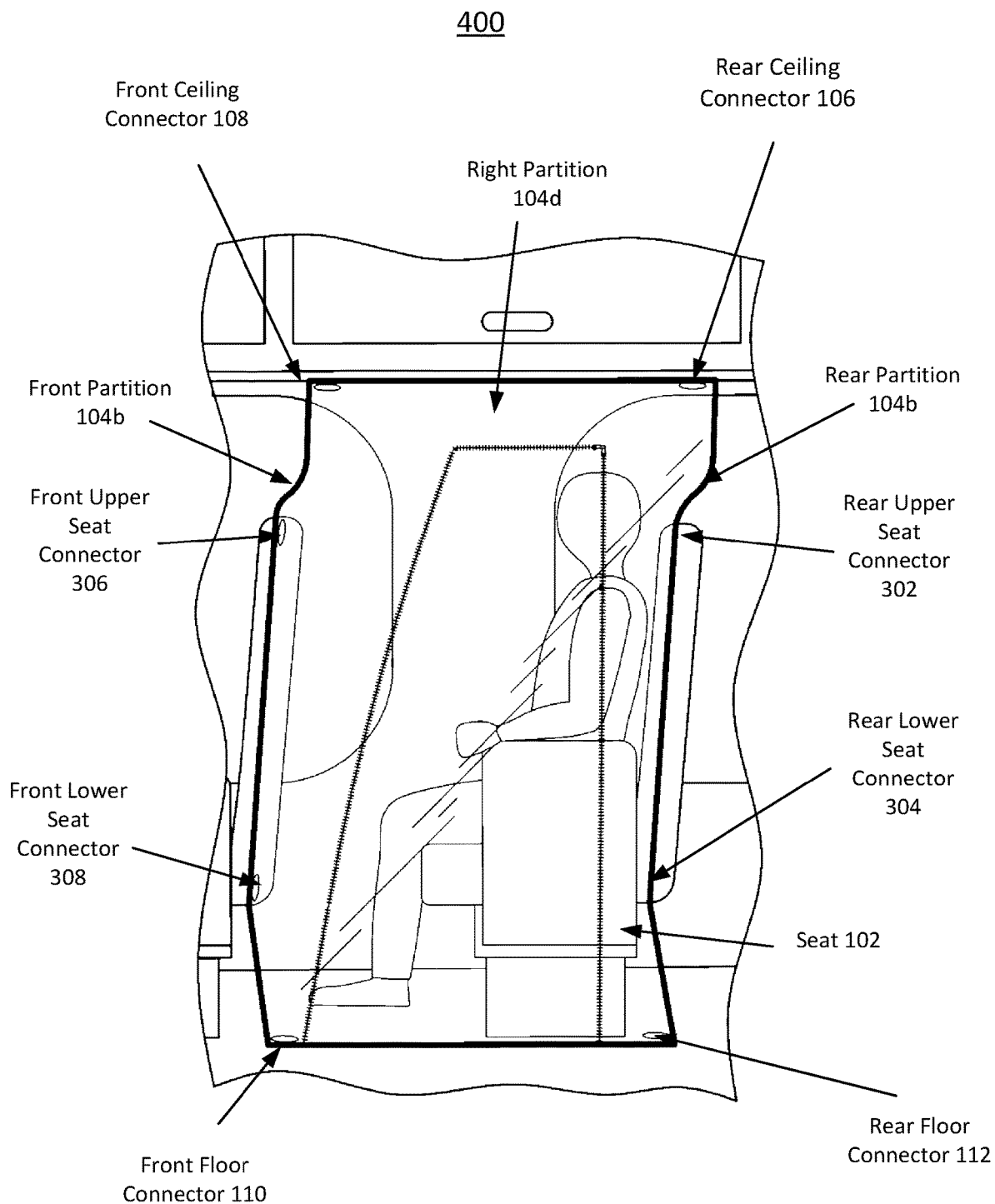
FIG. 4 is a diagram illustrating a version of the biosafety enclosure with a plurality of connectors in a vehicle, in accordance with aspects of the present disclosure.

FIG. 4 is a diagram illustrating a version of the biosafety enclosure (i.e., biosafety enclosure 400) with a plurality of connectors in a vehicle, in accordance with aspects of the present disclosure. As depicted in FIG. 4, biosafety enclosure 204 may be shaped around seat 102 such that there are a plurality of connectors that keep biosafety enclosure 400 fixed around seat 102 and space is conserved between adjacent biosafety enclosures.

Rear partition 104b between rear ceiling connectors 106 and rear upper seat connectors 302 prevents airflow from passing above and behind the occupant seated in seat 102. In some aspects, a separate partition may be created between rear upper seat connectors 302 and rear lower seat connectors 304. In some aspects, the seat itself may serve as the partition such that additional material for the protective cover member is unnecessary. Lower seat connectors 304 and 308 and upper seat connectors 302 and 306 may be attached directly to seat 102, a wall, a suspended structure (e.g., a horizontal beam) or a fixed structure (e.g., an upright pole), nearby the seat. Rear lower seat connectors 304 may be connected to rear floor connectors 112. The partition between connectors 304 and 112 prevents air flow from beneath seat 102 to rear seats. In some aspects, rear floor connector 112 may be connected to front floor connector 110 with a dedicated partition that is a part of biosafety enclosure 204. In some aspects, the partition between rear floor connector 112 and front floor connector 110 is the floor of the vehicle. Front floor connector 110 may be connected to front lower seat connector 308 of the seat in front of seat 102. In some aspects, front lower floor connector 308 is directly connected to front ceiling connector 108 with a partition that wraps around the seat in front of seat 102. In other aspects, front partition 104b exists between front upper seat connector 306 and front ceiling connector 108.

It should be noted that FIG. 4 only shows one side of the seat 102 (e.g., the left side). There is another plurality of connectors on the opposite side of seat 102 that mirrors the plurality of connectors depicted in FIG. 4. A respective partition attached to a connector of the plurality of connectors is also connected to a corresponding connector of another plurality of connectors. This indicates that the partition between connectors 302 and 106 on the left side of seat 102 extends to connectors 302 and 106 that exist on the right side of seat 102 (e.g., a rectangular transparent plastic partition 104b).

Figure 5:
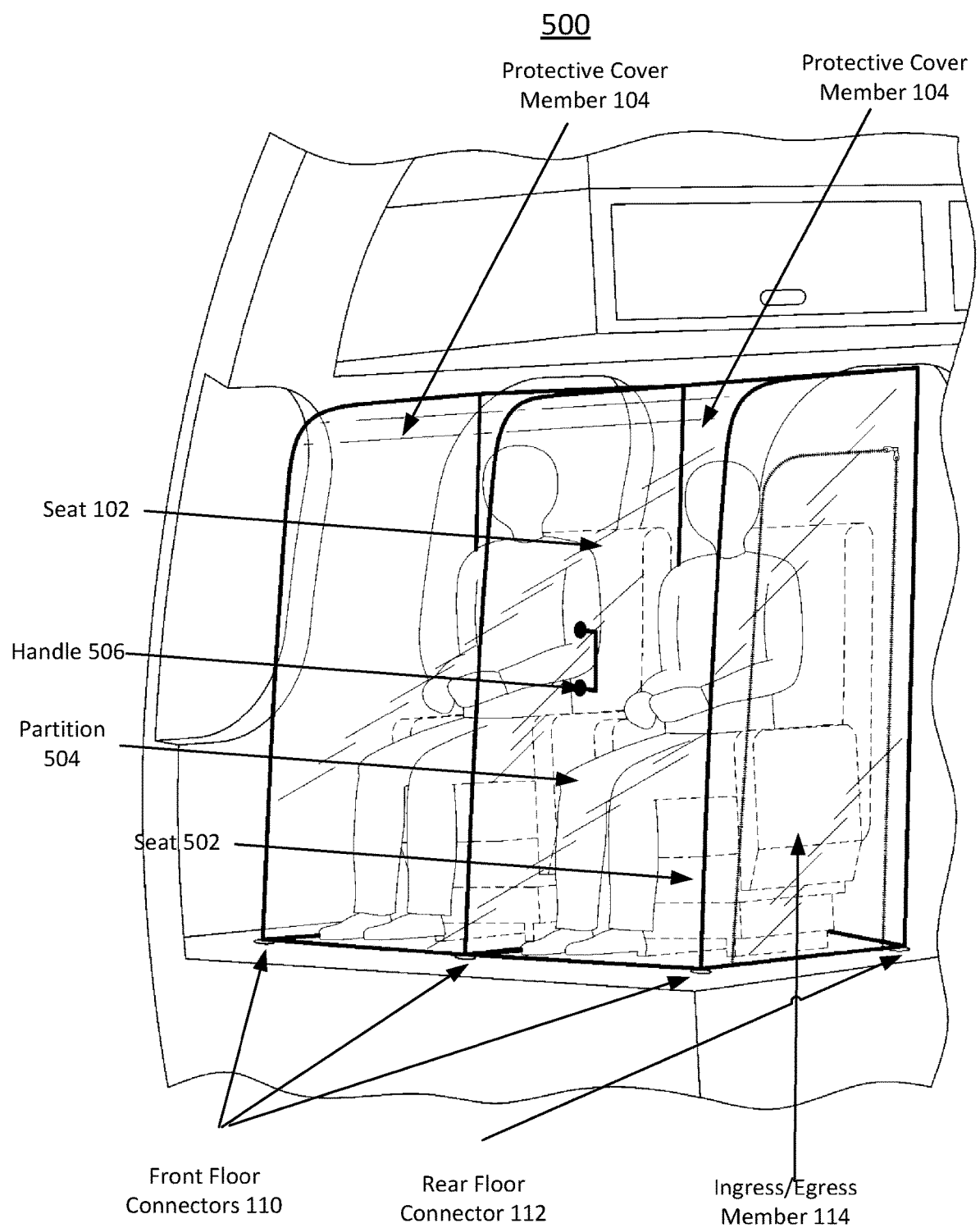
FIG. 5 is a diagram illustrating multiple attached biosafety enclosures, in accordance with aspects of the present disclosure.

FIG. 5 is diagram 500 illustrating multiple attached biosafety enclosures, in accordance with aspects of the present disclosure. Diagram 500 depicts adjacent seats 102 and 502. These seats may be in a vehicle such as a plane, a train, a boat, etc. In traditional travel, a first passenger may sit in seat 102 and a second passenger may sit in seat 502. If the first passenger is sick or is asymptomatic yet carrying a pathogen, the second passenger is at risk of exposure to the pathogen. The pathogen may be a virus (e.g., Covid-19) or bacteria that can be transferred through air particles or physical contact. The second passenger is thus exposed to the pathogen if the second passenger breathes in air that has been exhaled by the first passenger.

In some cases, small liquid particles may become airborne if the first passenger coughs or sneezes. Even if the first passenger covers his nose/mouth while coughing or sneezing, the type of cover used may still pose risks for the second passenger. Accordingly, each seat may be covered in a biosafety enclosure. In some aspects, a bigger biosafety enclosure encompassing both seats may be used with partition 504 between the two seats. In such a case, an ingress/egress member 114 may be disposed in the right side and/or the left partition of the larger biosafety enclosure.

In some aspects, the partition 504 can be removed or adjusted in adjacent biosafety enclosures as shown in FIG. 5 when the occupants sitting in seats 102 and 502 wish to physically interact with one another. Suppose that the occupants seated in seats 102 and 502 are family members that would like to interact with one another during a flight. In some aspects, the partition 504 between the adjacent biosafety enclosures may include a window (e.g., formed as a zip-able cut-out in partition 504). In some aspects, partition 504 may be a fixed shutter panel that can be closed or opened. In some aspects, partition 504 may be an accordion door that can be raised vertically or pushed aside horizontally via handle 506. In some aspects, the partition may be rolled and unrolled. When partition 504 between biosafety enclosures is modified to allow interaction between occupants, the two or more biosafety enclosures can be considered a single large biosafety enclosure.

Figure 6:
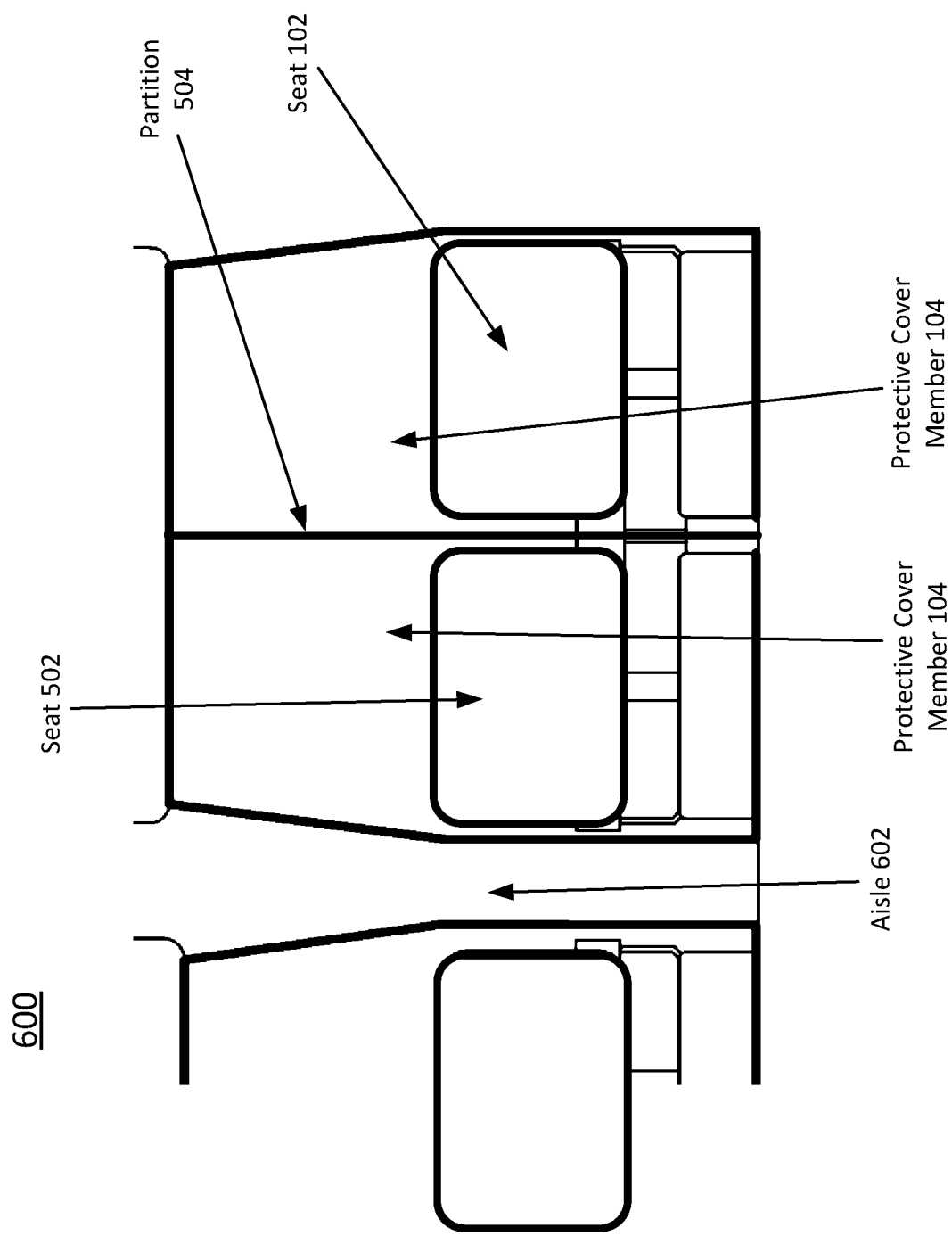
FIG. 6 is a diagram illustrating an aerial view of multiple attached biosafety enclosures, in accordance with aspects of the present disclosure.

FIG. 6 is diagram 600 illustrating an aerial view of multiple attached biosafety enclosures, in accordance with aspects of the present disclosure. When partition 504 is adjusted (e.g., removed or rolled up) by an occupant, biosafety enclosures in FIG. 5 may be considered a single biosafety enclosure that isolates the two occupants seated in seats 102 and 502 from pathogens outside of the merged biosafety enclosures. For example, a passenger may walk through aisle 602 and cough/sneeze into his/her hand. It is common for passengers to grab hold of seatbacks or headrests to maintain their balance. As a result, if the walking passenger places his/her hand on the headrest of seat 502, the passenger seated in seat 502 has a higher risk of infection. This is also applicable even when the walking passenger is asymptomatic to the pathogen he/she carries. The large biosafety enclosure not only protects the passenger in seat 502, but also the passenger in seat 102 (as the pathogen may otherwise be spread via the passenger in seat 502). The walking passenger at best would touch the outside of the protective cover member 104, or a handle of the biosafety enclosure (depicted in FIG. 7).

Figure 7:
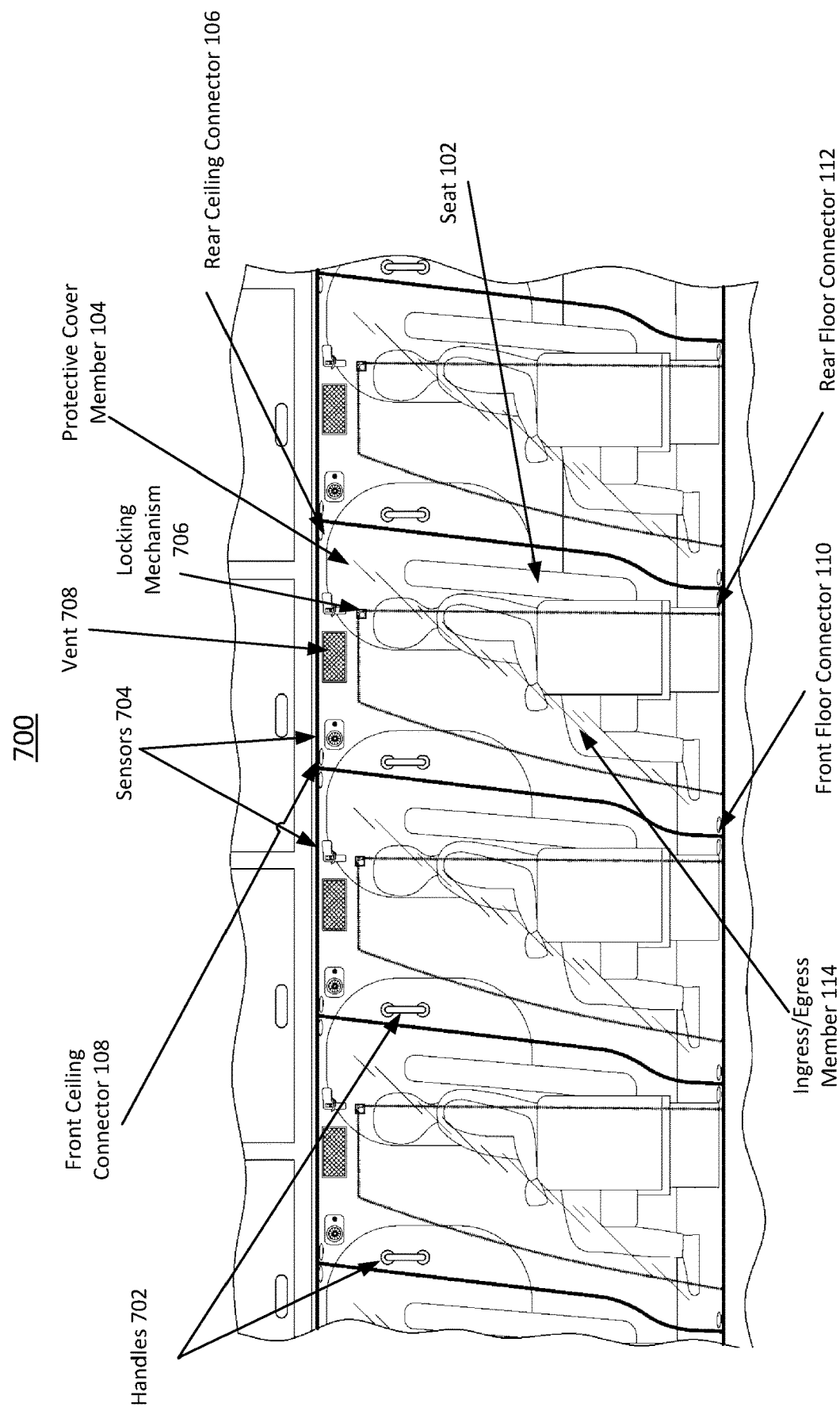
FIG. 7 is a diagram illustrating an aisle view of a plurality of biosafety enclosures in a vehicle comprising multiple seats, in accordance with aspects of the present disclosure.

FIG. 7 is diagram 700 illustrating an aisle view of a plurality of biosafety enclosures in a vehicle comprising multiple seats, in accordance with aspects of the present disclosure. In some aspects, because airflow is prevented from entering and exiting a biosafety enclosure, vent 708 is installed inside each biosafety enclosure in a vehicle. Vent 708 may represent one or more air circulation vents disposed within the protective cover member, wherein vent 708 is connectable to an external air filtration device or an air filtration system of the vehicle. More specifically, vent 708 represents an air filtration/circulation system found in many modes of transportation. Vent 708 may introduce fresh air and filter or safely expel air from a biosafety enclosure. Airplanes in particular have exemplary air management systems that may be incorporated into vent 708. In some aspects, vent 708 is connected to a separate clean air reserve rather than a clean air reserve shared by many occupants.

If a occupant needs to leave their seat for any reason, normally, other seats are used to maintain balance while in motion. With the biosafety enclosures of the present disclosure installed, the seats will be less readily available. In order to prevent damage to the biosafety enclosures and prevent injury to occupants, there can be reinforced areas at regular intervals that can accommodate grab-handles. Diagram 700 depicts handles 702 that are each placed on an outer surface of a partition of the protective cover membrane. In some aspects, handles 702 are installed on the previously described frame of each biosafety enclosure. Handles 702 can incorporate materials that have anti-bacterial/anti-viral properties that are intrinsic to the material or as a coating.

In some aspects, each biosafety enclosure of the vehicle includes sensors 704. Sensors 704 may be a variety of sensors that monitor the occupant and the biosafety enclosure. Such sensors include temperature sensors, cameras, motion sensor, air quality sensors, microphones, etc. For example, sensors 704 may comprise a non-contact digital laser infrared thermometer that can measure the temperature of an occupant periodically. Sensors 704 may also comprise a microphone that can be used to detect coughing and sneezing. Sensors 704 may additionally measure the vital signs of the occupant including body temperature, blood pressure, pulse, and breathing rate. For simplicity, sensors 704 are depicted in FIG. 7 as located on the ceiling of each biosafety enclosure. One skilled in the art will appreciate, however, that sensors 704 may be placed in multiple different locations depending on the data a given sensor is to acquire. For example, one sensor may be placed on an arm rest of seat 202, while another sensor may be placed on the rear of the head rest of the seat in front of seat 202.

Data from these sensors can be used to plan exit strategies for each biosafety enclosure. Suppose that the vehicle is a coach bus or a plane in which all occupants are headed to the same destination. Upon arrival, all occupants may immediately attempt to exit their biosafety enclosures at the same time—exposing one another to potential pathogens. Flight attendants or a bus crew can help guide the unloading of the vehicle by instructing occupants to stay within their biosafety enclosures until directed to exit. In some cases, during the trip, an occupant may have been coughing/sneezing or had an elevated temperature. The information gathered from each of sensors 704 can be transmitted to a computer system comprising a risk detection module. The risk detection module may analyze the data in real-time and assign a likelihood to each respective biosafety enclosure as containing potential pathogens. If the occupant seated in seat 102 is indeed sick, sensors 704 will capture audio data that includes coughing/sneezing sounds as well as body temperature data. Having determined the likelihood of a biosafety enclosure having a sick occupant (and thus causing potential pathogenic exposure to other passengers), the risk detection module can transmit an exit strategy to the flight attendants and travel crew. This exit strategy may, for example, allow occupants sitting in low likelihood biosafety enclosures to exit the vehicle before occupants sitting in high likelihood biosafety enclosures (i.e., the occupants that are sick). This allows un-sick occupants from being exposed to pathogens while walking in aisles.

In some aspects, the exit strategy can be conveyed to the occupants of each biosafety enclosure via signaling through lights installed in the respective biosafety enclosure, sounds via speakers, or displays in the vehicle. Such signals may alert the occupant(s) of a biosafety enclosure of when they are able to de-board or when they should refrain from exiting the biosafety enclosure.

In some aspects, the exit strategy is transmitted to locking mechanism 706 installed in each biosafety enclosure's ingress/egress member 114. Locking mechanism 706 may prevent an occupant from exiting the biosafety enclosure via ingress/egress member 114 until locking mechanism 706 is unlocked. Locking mechanism 706 may include a network adapter that communicates with the computer system comprising the risk detection module. In some aspects, sensors 704, vent 708, and locking mechanism 706 may be hardwired to an on-board computer system. Accordingly, the biosafety enclosures with the lowest likelihoods of pathogenic exposure are unlocked first, followed by biosafety enclosures with higher likelihoods. The calculated likelihoods may also be used for cleaning purposes. For example, cleaning crews may prioritize biosafety enclosures for cleaning that are associated with higher likelihoods of pathogenic exposure.

Figure 8:
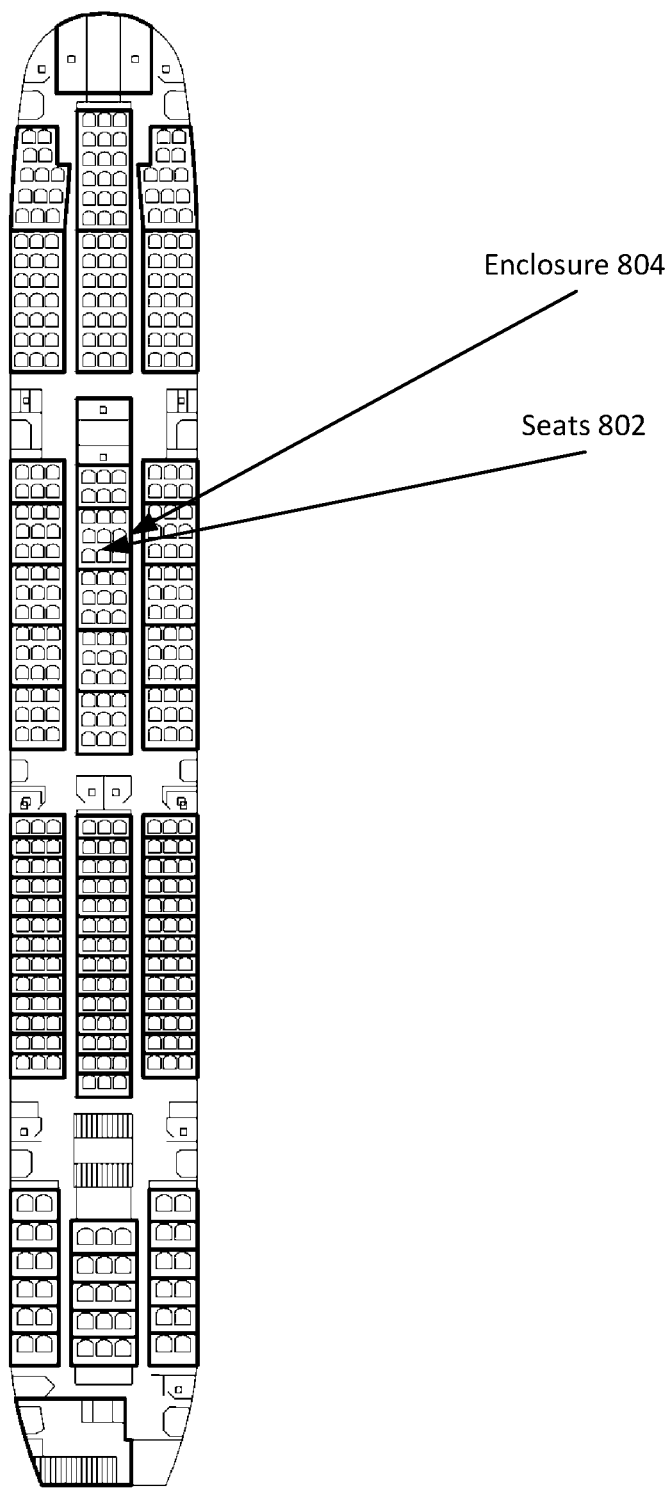
FIG. 8 is a diagram illustrating a floor plan of a vehicle comprising a plurality of biosafety enclosures, in accordance with aspects of the present disclosure.

FIG. 8 is diagram 800 illustrating a floor plan of a vehicle comprising a plurality of biosafety enclosures, in accordance with aspects of the present disclosure. As depicted in FIG. 8, the biosafety enclosures can be configured as required for any floorplan. There may be as few as one occupant per biosafety enclosure (e.g., in business/first class) or in groups of seats or other areas such as the galley. For example, biosafety enclosure 804 forms a barrier around seats 802, which comprises nine seats. In some aspects, if multiple rows of seats are grouped, the configuration can include one entry/exit per row for efficiency during boarding/deboarding. In some aspects, entire sections may also be compartmentalized under a single large biosafety enclosure.

Figure 9:
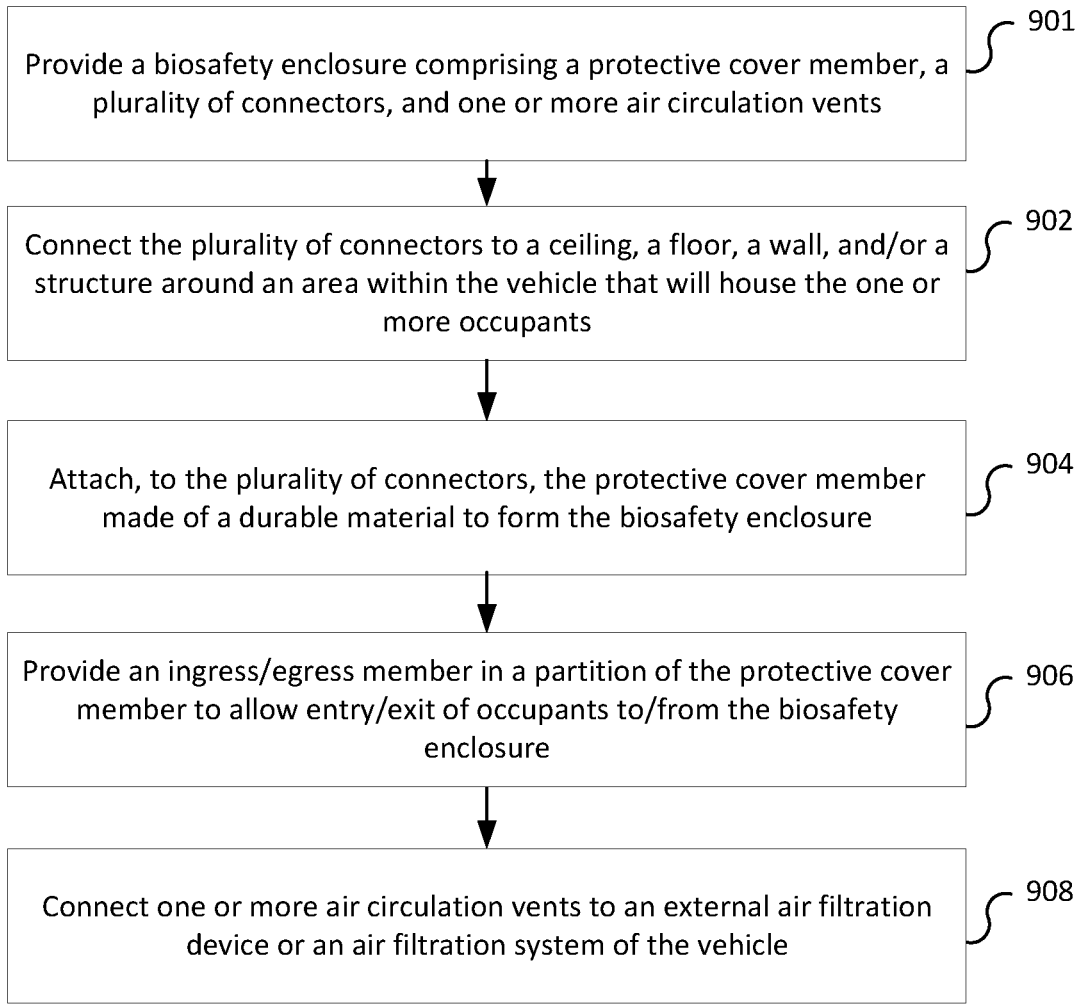
FIG. 9 is a flow diagram illustrating a method for installing the biosafety enclosure in a vehicle, in accordance with aspects of the present disclosure.

FIG. 9 is a flow diagram illustrating method 900 for installing the biosafety enclosure in a vehicle, in accordance with aspects of the present disclosure. At 901, method comprises providing the biosafety enclosure comprising a protective cover member and a plurality of connectors. At 902, method 900 comprises connecting the plurality of connectors to a ceiling, a floor, a wall, and/or a structure around an area within the vehicle that will house the one or more occupants. At 904, method 900 comprises attaching, to the plurality of connectors, the protective cover member made of a durable material to form the biosafety enclosure. At 906, method 900 comprises providing an ingress/egress member in a partition of the protective cover member to allow entry/exit of occupants to/from the biosafety enclosure. At 908, method 900 comprises connecting an external air filtration device or an air filtration system of the vehicle to one or more air circulation vents of the biosafety enclosure.

Figure 10:
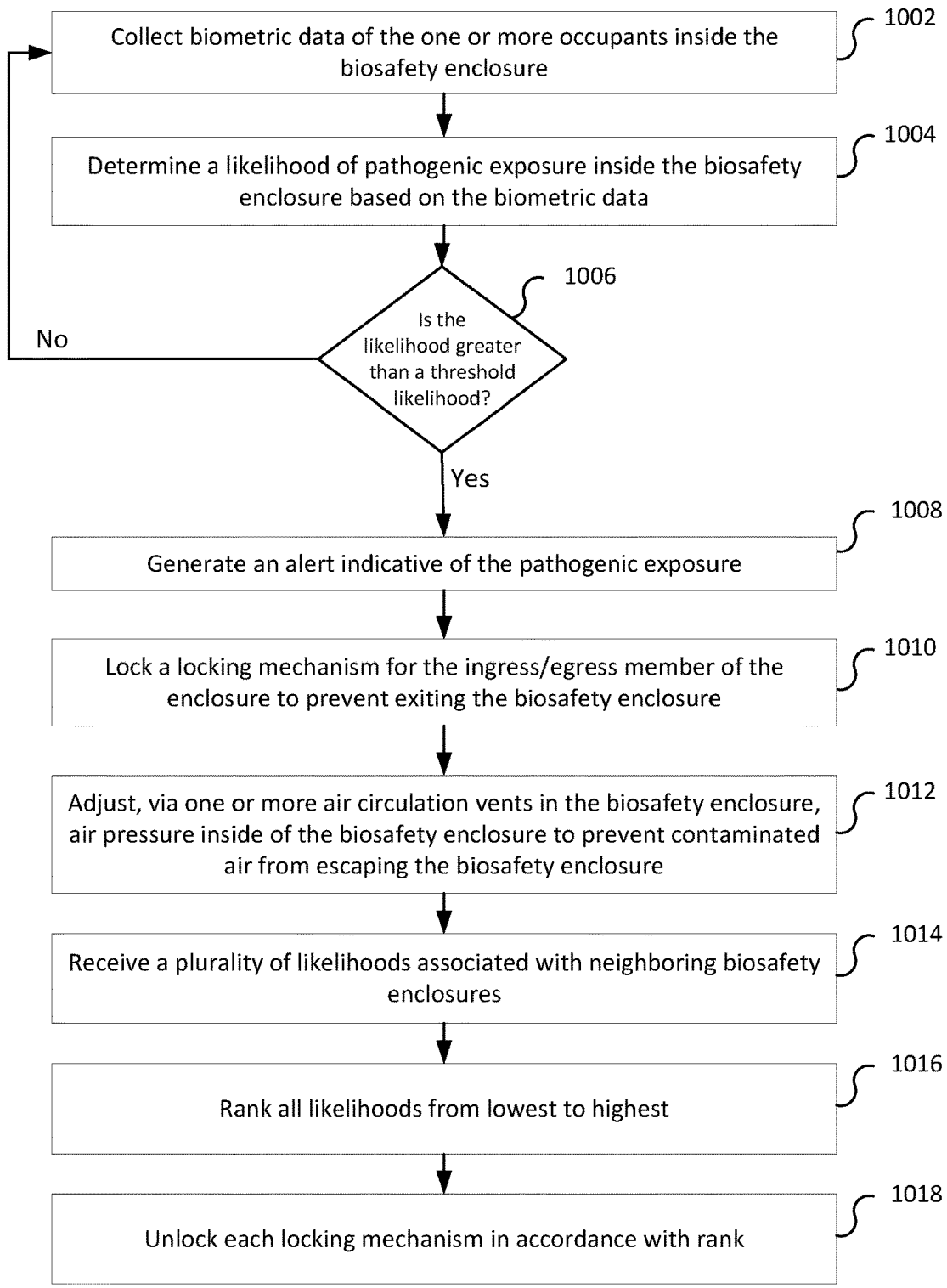
FIG. 10 is a flow diagram illustrating method 1000 for using features of the biosafety enclosure to protect occupants in a vehicle from pathogens, in accordance with aspects of the present disclosure.

FIG. 10 is a flow diagram illustrating method 1000 for using features of the biosafety enclosure to protect occupants in a vehicle from pathogens, in accordance with aspects of the present disclosure. At 1002, a risk detection module collects biometric data of the one or more occupants inside the biosafety enclosure. The risk detection module is installed on a computer system on the vehicle. In some aspects, there may be one computer system per vehicle that collects biometric data for each biosafety enclosure in the vehicle. In other aspects, there is one computer system per biosafety enclosure in the vehicle. In yet some other aspects, multiple computer systems may be present in a vehicle, each managing a plurality of biosafety enclosures. In yet some other aspects, the computer system with the risk detection module may not be located in the vehicle and the sensors 704, vents 708, and locking mechanisms 706, may communicate with the computer system over a network (e.g., the Internet). In some aspects, the data collected may be presented to the occupant via an installable application on a computer system belonging to the occupant (e.g., a smart phone application or a laptop application). In some aspects, the data collected may be presented to the occupant via displays installed in the vehicle itself. For example, certain planes have displays installed behind seats that allow passengers to view media and track airplane location. On these displays, biometric data for the passenger may be displayed as well.

At 1004, the risk detection module determines a likelihood of pathogenic exposure inside the biosafety enclosure based on the biometric data. For example, the risk detection module may determine a number of times an occupant of the biosafety enclosure coughs or sneezes using sensors 704, which may include a microphone and/or camera. The risk detection module may also use sensors 704, which may include a non-contact temperature measurement device, to determine the occupants body temperature. In some aspects, the risk detection module may also use sensors 704, which may include a blood pressure monitor, to evaluate the heart rate, breathing rate, and blood pressure of the occupant. The risk detection module may then compare the acquired values of amount of coughs/sneezes, body temperature, heart rate, breathing rate, and/or blood pressure, to thresholds that indicate the likelihood of pathogenic exposure. The likelihood may be a quantitative value (e.g., a number between 1-10, a fraction, a percentage, etc.) or a qualitative values (e.g., "no," "yes," or "unlikely," "likely," and "very likely"). In some aspects, the risk detection module applies a probabilistic function on the acquired values to output the likelihood. For example, if an occupant's temperature is 99.4 degrees Fahrenheit and the occupant coughed/sneezed ten times during a flight, the risk detection module may determine that the likelihood of pathogenic exposure inside the biosafety enclosure is 9/10.

At 1006, the risk detection module determines whether the likelihood is greater than a threshold likelihood (e.g., 7/10). In response to determining that the likelihood is not greater than the threshold likelihood, method 1000 returns to 1002 as the risk detection module continues to collect biometric data. In response to determining that the likelihood is greater than the threshold likelihood, method 1000 advances 1008.

At 1008, the risk detection module generates an alert indicative of the pathogenic exposure. The alert may be in the form of a sound, a light, or a notification, on the computing system associated with the vehicle.

At 1010, the risk detection module locks a locking mechanism for the ingress/egress member of the biosafety enclosure to prevent exiting the biosafety enclosure. For example, because the chances of an occupant exposing another passenger to a pathogen may be likely, the occupant's exiting of the biosafety enclosure is prevented until it is safe for the other passengers.

At 1012, the risk detection module adjusts, via one or more air circulation vents 708 in the biosafety enclosure, air pressure inside of the biosafety enclosure to prevent contaminated air from escaping the biosafety enclosure. Suppose that the vehicle is an airplane. At cruising altitude, large passenger airplanes have approximately 570 mmHg of pressure (equivalent to 0.75 atm or 75% of normal atmospheric pressure at sea level) in the cabin. According to Centers for Disease Control and Prevention (CDC) guidelines, a negative pressure enclosure should have a pressure difference of $-1.9 \times 10^{-3}$ mmHg ($2.5 \times 10^{-6}$ atm) with respect to areas outside of the enclosure. This pressure difference ensures that air only flows into the biosafety enclosure, preventing contaminated air from escaping to potentially infect others. Normally, if all areas are at the same pressure, air will not naturally move between areas unless something forces the air to move (e.g., motion, walking, air filtration systems, etc.). The exchange of air should be minimal when biosafety enclosures are used. In history, there has been at least one case of a passenger boarding a flight and only informing the crew that he/she was positive for a contagious virus when the flight was already well on its way to the destination. To protect all other passengers, the passenger may be confined to the biosafety enclosure. The risk detection module may then activate negative air pressure as extra protection against the pathogen escaping. The risk detection module may achieve the negative pressure by adjusting the incoming air flow rate and exhaust air flow rate within a particular enclosure. If the exhaust air flow rate is slightly higher than the incoming air flow rate, negative pressure will be generated.

At 1014, the risk detection module receives a plurality of likelihoods associated with neighboring biosafety enclosures. Referring to FIG. 7, several passengers may be in biosafety enclosures. Suppose that all of the passengers except for the first passenger shown in the figure are healthy. The risk detection module determines the likelihood of each biosafety enclosure being contaminated. It is possible that for the four enclosures shown, the likelihoods are 9/10, 4/10, 5/10, and 3/10 (left to right).

At 1016, the risk detection module ranks all likelihoods from lowest to highest. In this case, the fourth enclosure is ranked first, followed by the second, third, and first. Suppose that the threshold likelihood is 2/10, which would mean that all biosafety enclosures are locked. At 1018, the risk detection module unlocks each locking mechanism in accordance with rank. The lowest ranked enclosure is unlocked first because the chances of the occupants in that enclosure exposing (e.g., via the air in an aisle of the vehicle) all other passengers to the pathogen are relatively low. Subsequently, the next lowest ranked enclosure is unlocked. In some aspects, the risk detection module utilizes a timer to determine when to unlock the enclosures. For example, the risk detection module may unlock the next enclosure after 30 seconds has elapsed. In some aspects, the risk detection module may utilize sensors 704 (e.g., a camera) to determine whether the unlocked biosafety enclosure no longer has an occupant and in response to determining that the biosafety enclosure does not have an occupant, unlock the next biosafety enclosure. This process continues until the last biosafety enclosure (i.e., the one with the highest likelihood of pathogenic exposure is unlocked).

Figure 11:
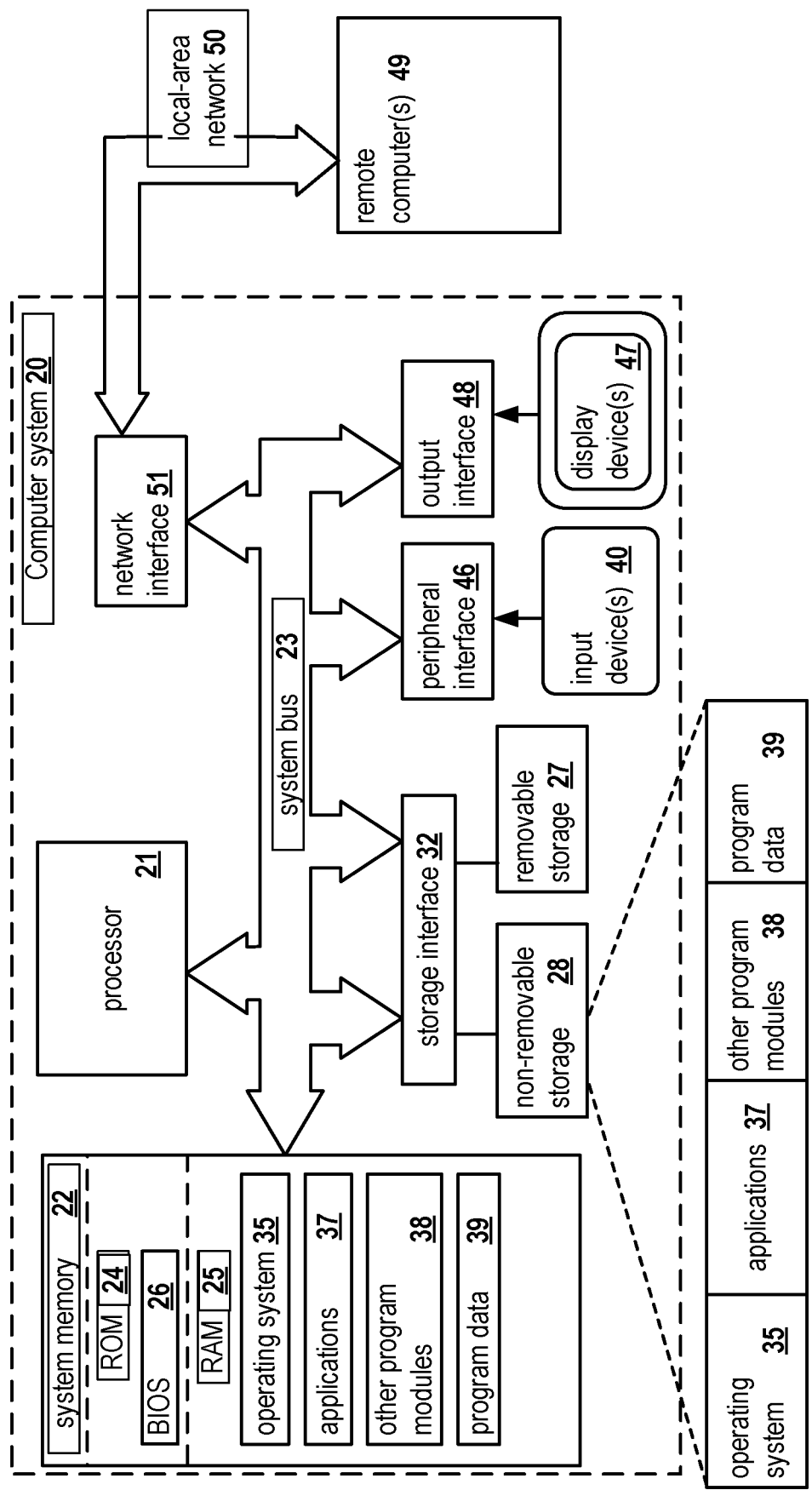
FIG. 11 is a diagram of a general-purpose computer system on which aspects of the present disclosure can be implemented.

FIG. 11 is a block diagram illustrating a computer system 20 on which aspects of systems and methods for using features of the biosafety enclosure to protect occupants of a vehicle from pathogens may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21 (also referred to as a hardware processor), a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps associated with the risk detection module, sensors, air circulation systems, and locking mechanisms discussed in FIGS. 1-10 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, voice input device, touch input device, or other peripheral devices, such as locking mechanism 706, sensors 704, and vent 708 via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A biosafety enclosure for one or more occupants of a vehicle, the biosafety enclosure comprising:
 a protective cover member made of a durable material shaped to form a three-dimensional structure that is installed inside of the vehicle and isolates the one or more occupants of the biosafety enclosure from other occupants of the vehicle;
 a plurality of connectors attached to the protective cover member and configured to affix to a ceiling, a floor, a wall, and/or a structure within the vehicle in order to secure the protective cover member inside the vehicle, wherein the protective cover member encompasses at least one seat of the vehicle and wherein a size of the biosafety enclosure can be modified by reclining the at least one seat of the vehicle;

one or more air circulation vents disposed within the protective cover member, wherein the one or more air circulation vents are connectable to an external air filtration device or an air filtration system of the vehicle; and an ingress/egress member comprised in the protective cover member to allow entry/exit of occupants to/from the biosafety enclosure.

2. The biosafety enclosure of claim 1, wherein the protective cover member is comprised of a plurality of partitions comprising at least a front partition, a rear partition, a right-side partition, and a left-side partition, and wherein the ingress/egress member is disposed in one of the plurality of partitions.

3. The biosafety enclosure of claim 2, wherein at least one partition of the plurality of partitions is transparent.

4. The biosafety enclosure of claim 2, wherein the plurality of partitions is made up of at least one of: fabric, plastic, metal, wood, steel.

5. The biosafety enclosure of claim 1, wherein at least one of the plurality of connectors is attached to the at least one seat and secures at least one partition of the plurality of partitions to the at least one seat.

6. The biosafety enclosure of claim 2, wherein a size of the biosafety enclosure can be modified while housing an occupant by expanding or retracting one or more partitions of the plurality of partitions.

7. The biosafety enclosure of claim 2, wherein the biosafety enclosure can be merged with an adjacent biosafety enclosure by modifying or removing at least one partition, of the plurality of partitions, between the biosafety enclosure and the adjacent biosafety enclosure.

8. The biosafety enclosure of claim 2, wherein at least one partition of the plurality of partitions is made of a fire-retardant material.

9. The biosafety enclosure of claim 1, wherein the plurality of connectors comprises at least one of a hook, a sealant, stitching, a staple, a magnet, a spring snap, and a hook-and-loop fastener.

10. The biosafety enclosure of claim 1, wherein the plurality of connectors are comprised in a frame that forms a shape of the three-dimensional structure and the protective cover member is attached to the frame.

11. The biosafety enclosure of claim 1, wherein the ingress/egress member is a sealable cutout in the protective cover member.

12. The biosafety enclosure of claim 1, further comprising a handle attached to an outer surface of the biosafety enclosure, wherein the handle provides support to occupants of the vehicle while moving within the vehicle.

13. A method for providing biosafety of occupants of a vehicle, the method comprising:
providing a biosafety enclosure comprising: (1) a protective cover member made of a durable material shaped to form a three-dimensional structure that isolates one or more occupants of the biosafety enclosure from other occupants of the vehicle, wherein the protective cover member encompasses at least one seat of the vehicle and wherein a size of the biosafety enclosure can be modified by reclining the at least one seat of the vehicle; (2) a plurality of connectors; and (3) one or more air circulation vents;
connecting the plurality of connectors to a ceiling, a floor, a wall, and/or a structure around an area within the vehicle that will house the one or more occupants;
providing an ingress/egress member in a partition of the protective cover member to allow entry/exit of occupants to/from the biosafety enclosure; and connecting an external air filtration device or an air filtration system of the vehicle to the one or more air circulation vents of the biosafety enclosure.

14. A system for pathogen protection in a vehicle, the system comprising:
a biosafety enclosure for one or more occupants of a vehicle, the biosafety enclosure comprising:
a protective cover member made of a durable material shaped to form a three-dimensional structure that is installed inside of the vehicle and isolates the one or more occupants of the biosafety enclosure from other occupants of the vehicle, wherein the protective cover member encompasses at least one seat of the vehicle and wherein a size of the biosafety enclosure can be modified by reclining the at least one seat of the vehicle;
at least one sensor that collects biometric data of the one or more occupants inside the biosafety enclosure; and
a program code embedded in a non-transitory medium and executable by a hardware processor configured to:
receive the biometric data;
determine a likelihood of pathogenic exposure inside the biosafety enclosure based on the biometric data; and
generate an alert indicative of the pathogenic exposure in response to determining that the likelihood is greater than a threshold likelihood.

15. The system of claim 14, wherein the biosafety enclosure further comprises an ingress/egress member comprised in the protective cover member to allow entry/exit of occupants to/from the biosafety enclosure, wherein the system further comprises a lock for the ingress/egress member of the biosafety enclosure, and wherein the hardware processor is further configured to prevent, via the lock, occupant from exiting the biosafety enclosure in response to determining that the likelihood is greater than the threshold likelihood.

16. The system of claim 15, wherein the hardware processor is further configured to:
receive a plurality of likelihoods associated with neighboring biosafety enclosures;
compare the likelihood of the biosafety enclosure with the plurality of likelihoods of the neighboring biosafety enclosures; and
unlock the ingress/egress member of the biosafety enclosure based on the comparison.

17. The system of claim 14, wherein the biosafety enclosure further comprises one or more air circulation vents disposed within the protective cover member, wherein the one or more air circulation vents are connectable to an external air filtration device or an air filtration system of the vehicle, wherein the hardware processor is further configured to adjust, via the one or more air circulation vents, air pressure inside of the biosafety enclosure to prevent contaminated air from escaping the biosafety enclosure in response to determining that the likelihood is greater than the threshold likelihood.

18. The system of claim 14, wherein the biometric data comprises at least one of:
(1) an indication of coughing,
(2) an indication of sneezing,
(3) body temperature,
(4) heart rate,
(5) blood pressure, and
(6) breathing rate.

* * * * *